US009782947B2

(12) United States Patent
Gunzel et al.

(10) Patent No.: US 9,782,947 B2
(45) Date of Patent: Oct. 10, 2017

(54) FIRE RESISTANT LAMINATES AND ARTICLES MADE THEREFROM

(75) Inventors: Edward Gunzel, Oxford, PA (US); Dattatreya R. Panse, Lincoln University, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 1649 days.

(21) Appl. No.: 11/753,599

(22) Filed: May 25, 2007

(65) Prior Publication Data
US 2011/0076494 A1    Mar. 31, 2011

(51) Int. Cl.
| | | |
|---|---|---|
| *A41D 31/00* | (2006.01) | |
| *B32B 3/28* | (2006.01) | |
| *B32B 5/02* | (2006.01) | |
| *B32B 7/12* | (2006.01) | |
| *B32B 27/12* | (2006.01) | |
| *B32B 27/34* | (2006.01) | |
| *B32B 27/36* | (2006.01) | |
| *B32B 27/40* | (2006.01) | |
| *B32B 27/28* | (2006.01) | |
| *B32B 27/30* | (2006.01) | |

(52) U.S. Cl.
CPC ............ *B32B 3/28* (2013.01); *A41D 31/0027* (2013.01); *B32B 5/02* (2013.01); *B32B 7/12* (2013.01); *B32B 27/12* (2013.01); *B32B 27/283* (2013.01); *B32B 27/304* (2013.01); *B32B 27/34* (2013.01); *B32B 27/36* (2013.01); *B32B 27/40* (2013.01); *A41D 2400/22* (2013.01); *A41D 2400/60* (2013.01); *B32B 2255/10* (2013.01); *B32B 2262/0261* (2013.01); *B32B 2307/308* (2013.01); *B32B 2307/3065* (2013.01); *B32B 2307/7265* (2013.01); *B32B 2437/00* (2013.01); *Y10T 428/28* (2015.01); *Y10T 428/2852* (2015.01)

(58) Field of Classification Search
CPC .................................................. A41D 31/0027
See application file for complete search history.

(56) References Cited

U.S. PATENT DOCUMENTS

| | | | |
|---|---|---|---|
| 4,194,041 A | 3/1980 | Gore et al. | 428/315 |
| 4,532,316 A | 7/1985 | Henn | 528/59 |

(Continued)

FOREIGN PATENT DOCUMENTS

| | | |
|---|---|---|
| EP | 0 906 824 | 4/1999 |
| JP | 57-89875 | 6/1982 |

(Continued)

*Primary Examiner* — Frank D Ducheneaux
(74) *Attorney, Agent, or Firm* — Kilpatrick Townsend & Stockton, LLP

(57) ABSTRACT

Laminates suitable for constructing waterproof and breathable articles such as protective clothing which are both comfortable and exhibit enhanced resistance to fire are described. Particularly, flame resistant laminate constructions are described comprising a meltable textile as the outermost layer laminated to an intermediate protective layer comprising a waterproof film laminated to an innermost fabric layer comprising a thermally stable textile. Laminate constructions of the present invention exhibit breathability on the order of at least 1000 MVTR, a water entry pressure of at least 0.5 psi and have a horizontal flame break open time of at least 10 seconds.

33 Claims, 4 Drawing Sheets

(56) References Cited

U.S. PATENT DOCUMENTS

| | | | | |
|---|---|---|---|---|
| 4,862,730 | A | | 9/1989 | Crosby .............................. 73/38 |
| 5,258,226 | A | * | 11/1993 | Nakagawa et al. ........... 428/339 |
| 5,418,054 | A | * | 5/1995 | Sun ............................ 428/308.4 |
| 6,511,927 | B1 | * | 1/2003 | Ellis et al. ...................... 442/77 |
| 6,531,419 | B1 | * | 3/2003 | Wyner et al. ................. 442/136 |
| 6,740,275 | B2 | * | 5/2004 | Urabe et al. ............... 264/176.1 |
| 2005/0266228 | A1 | * | 12/2005 | Jain et al. ................... 428/316.6 |
| 2005/0287894 | A1 | | 12/2005 | Burns et al. ................. 442/136 |
| 2007/0026752 | A1 | * | 2/2007 | Thiriot .......................... 442/217 |

FOREIGN PATENT DOCUMENTS

| | | |
|---|---|---|
| WO | WO 00/13889 | 3/2000 |
| WO | WO 2004098329 A1 * | 11/2004 |

\* cited by examiner

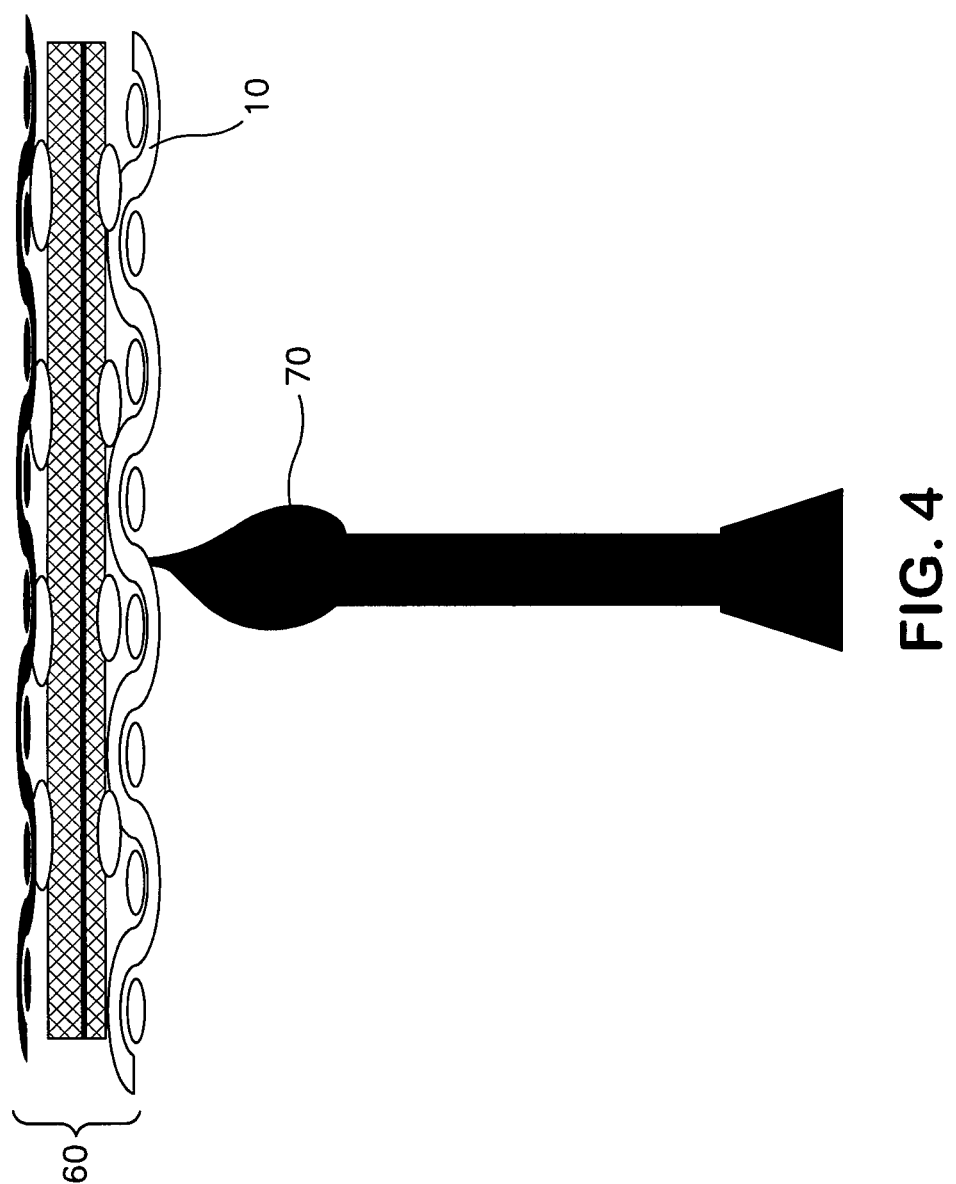

FIRE RESISTANT LAMINATES AND ARTICLES MADE THEREFROM

FIELD OF INVENTION

The present invention relates to a laminates suitable for constructing waterproof and breathable articles such as protective clothing which are both comfortable and exhibit enhanced resistance to fire.

BACKGROUND OF INVENTION

Military personnel, firefighters, law enforcement officers and other professionals working in hazardous environment are commonly exposed to fire hazards. In order to reduce fire and flame related injuries, protective clothing is desired for such user community. Conventional protective clothing is designed to protect the wearer from hazardous environmental exposures such as flash fire, high heat, radiation, chemical and biological agents and body fluids. Depending on the severity of hazardous exposure, protective clothing differs in the degree of protection. In firefighting, maximum protection against flame and heat exposure is typically provided by using thick insulative layers of inherently flame retardant aramid fabrics, typically such as materials sold under the trade names KEVLAR® fiber and NOMEX® fiber (E.I. du Pont de Nemours and Company), and fluid barrier properties are provided by using microporous membrane, typically such as materials sold under the trade name CROSSTECH® moisture barrier (W.L.Gore & Associates). For professionals in hazardous environments where short duration exposure to fire or explosions is possible, such as military, search and rescue, police, etc., egress from fire is the protocol, so protection requirements are less stringent than for firefighters. The goal for protective gear in these circumstances is to provide some enhanced protection to allow the wearer to get away from the hazard quickly and safely, rather than to combat the hazard. It is believed that protection from flame exposure requires clothing which is resistant to or does not ignite, melt or disintegrate or break open upon short exposure to such hazards.

Traditionally, flame resistant protective garments have been made with an outermost layer comprising non-combustible, non-melting fabric made of typically KEVLAR® fiber, NOMEX® fiber, PBI type fibers, etc. These fibers are inherently flame resistant but have several limitations. Specifically, these fibers are very expensive, difficult to dye and print, less abrasion resistant and offer unsatisfactory tactile comfort as compared to nylon or polyester based fabrics.

For optimum user performance in many hazardous environments, protective gear should be not only flame resistant, but also waterproof and comfortable. Wearers prefer lightweight, breathable, waterproof and comfortable protective clothing. Conventional waterproof and breathable garments are made from monolithic or microporous film(s) bonded to a fabric surface by coating or lamination process. Adhesive lamination is a commonly used technique to join substrates together and it is widely used to bond fabric to film, film to film and/or combinations thereof. Adhesive layers applied during lamination may be continuous or discontinuous, depending on the nature of the adhesive; coatings are typically continuous layers applied during the coating process.

The cost of waterproof, flame resistant, protective clothing has been an important consideration for the large number of hazardous exposure applications outside fire protection, thereby precluding the use of typical, inherently flame resistant textiles such as those used in fire fighting community. Coatings have been used to create products with resistance to flame. These products typically use a continuous thick coating or layer of flame retardant polymer over a non-flame resistant fabric surface, such as nylon, polyester, and the like. In addition to flammability, these non-flame resistant textile fibers typical melt in the presence of high heat or flame. However, molten textile fibers present an additional danger in that skin contact can cause severe burns. In attempts to minimize these risks, textile producers have moved towards very heavy flame resistant coatings on such meltable, combustible textiles. For example, mattress fire barriers are typically made using a thick, flame retardant polymer coating on a non-refractory textile substrate. Additives such as halogenated flame retardants, metal hydroxides, phosphorus compounds and intumescent materials or combinations thereof have been used to make these polymer coatings flame retardant. US 2005/0287894, for example, discloses such a coated flame retardant product that utilizes a thick polymer coating to impart flame retardant properties to fabrics which are inherently not flame retardant such as nylon, polyester and cotton. The heavy coating of flame retardant polymer makes such coated products heavy, non-breathable, stiff, and generally unsuitable for protective clothing applications.

Overcoming the limitations of heavily coated, non-breathable, meltable flame retardant materials is difficult. In order to improve breathability and to reduce weight for garment applications, flame resistant laminates of inherently flame resistant textiles such as NOMEX® fabric are typically used. Laminates used in flame resistant breathable garments are typically constructed by joining together inherently flame retardant fabric and lightweight breathable films. CROSSTECH® moisture barrier, noted earlier, is an example of such a flame resistant laminate. The flame resistant NOMEX® fabric is oriented to be the outermost layer for flame protection. As previously mentioned, the use of an inherently flame resistant outer textile significantly increases the cost of such flame resistant protective apparel.

Accordingly, a long-felt need has existed for laminates and resulting garments, as well as other protective gear made from these laminates, for workers in hazardous environments which are breathable, waterproof and flame resistant, yet have additional advantages such as being lightweight, comfortable to wear, flexible, easy to color, fast drying, and affordable, which features do not exist in conventional flame resistant laminates and garments.

SUMMARY OF THE INVENTION

The present invention is directed to flame resistant laminate constructions comprising a meltable textile as the outermost layer laminated to an intermediate protective layer comprising a waterproof film laminated to an innermost fabric layer comprising a thermally stable textile. Laminate constructions of the present invention exhibit breathability on the order of at least 1000 MVTR, a water entry pressure of at least 0.5 psi and have a horizontal flame break open time of at least 10 seconds. Under alternative embodiments, the laminates can withstand a horizontal flame break open time of at least 15 seconds, or even at least 20 seconds.

Meltable textile layers of the present invention include those textiles which melt when subjected to the Melting and Thermal Stability Test conditions, described in detail herein. Suitable meltable textile layers of the present invention include, but are not limited to, materials such as polyamide (including, but not limited to, nylon 6, nylon 6,6 and nylon 4,6), polyester, polypropylene, polyethylene, PVC, polyethylene and PVA.

Suitable adhesives of the present invention include materials which are capable of bonding the layers using conventional lamination techniques, including but not limited to such materials as polyurethanes, silicones, polyesters, acrylics, epoxies, and polyamides. In one embodiment, the adhesives of the present invention may include at least one component or additive selected from the group consisting of chlorinated compounds, brominated compounds, antimony oxide, organic phosphorous-based compounds, zinc borate, ammonium polyphosphate, melamine cyanurate, melamine polyphosphate, molybdenum compounds, alumina trihydrate and magnesium hydroxide, which may enhance the flame resistance of the laminates.

Protective layers of the present invention are waterproof, yet exhibit suitable breathability for incorporation in the laminates of the present invention. Suitable protective layers may comprise any of polyurethane, polyester, silicone, polytetrafluoroethylene (PTFE), etc. Depending on the choice of components and final article properties, the protective layer may be a single film, or alternatively, the protective layer may comprise a composite construction. In one embodiment, the protective layer comprises an expanded PTFE film. In an alternative embodiment, the protective layer may include two or more expanded PTFE films. In a further alternative embodiment, the protective layer may comprise two or more expanded PTFE films bonded together with a polyurethane adhesive. In a further embodiment, the protective layer may comprise two or more expanded PTFE films bonded together with at least one of silicone, epoxy or polyester. In an even further embodiment, the protective layer may comprise a composite where one or more components of the protective layer adheres the protective layer to other layers of the laminate.

Thermally stable backer textiles of the present invention include textiles which are thermally stable when subjected to the Melting and Thermal Stability Test. The Test conditions are described herein. The textiles can be in the form of wovens, nonwovens, knits, flocked materials (i.e., flock fibers flocked to a substrate), etc. Examples of suitable thermally stable backer textile compositions include aramids, cottons, PBI, PBO, rayon, wool, modacrylic blends, polyamines, carbon, fiberglass, PAN, PTFE, and blends and combinations thereof.

Surprisingly, we have found that these unique constructions are suitable for forming flame resistant, waterproof, breathable, lightweight protective garments. While the present invention is not limited to a particular weight, laminate constructions on the order of 20 oz/yd$^2$ or less are possible in constructions of the present invention. In an alternative embodiment, laminate constructions on the order of 10 oz/yd$^2$ or less are possible in constructions of the present invention. In a further alternative embodiment, laminate constructions on the order of 7 oz/yd$^2$ or less are possible in constructions of the present invention. Unlike conventional flame resistant garments, the articles of the present invention do not require the inherently flame resistant outermost layers which are typically used in such garments. Garments made from such laminates are lightweight, easy to color, fast drying, breathable, waterproof and flame resistant. Further, it is contemplated that other flame resistant protective gear is within the scope of the present invention, including, for example, bivy bags, tents and other appropriate protective gear.

DESCRIPTION OF THE DRAWINGS

The foregoing summary, as well as the following detailed description of the invention, will be better understood when read in conjunction with the appended drawings. For purposes of illustrating the invention, there are shown in the drawings embodiments which are presently preferred. It should be understood, however, that the invention is not limited to the precise arrangements and instrumentalities shown. In the drawings:

FIG. 4 is a perspective view of the orientation of the flame relative to the laminate in the Horizontal Flame Test.

DETAILED DESCRIPTION OF THE INVENTION

Figure 1:
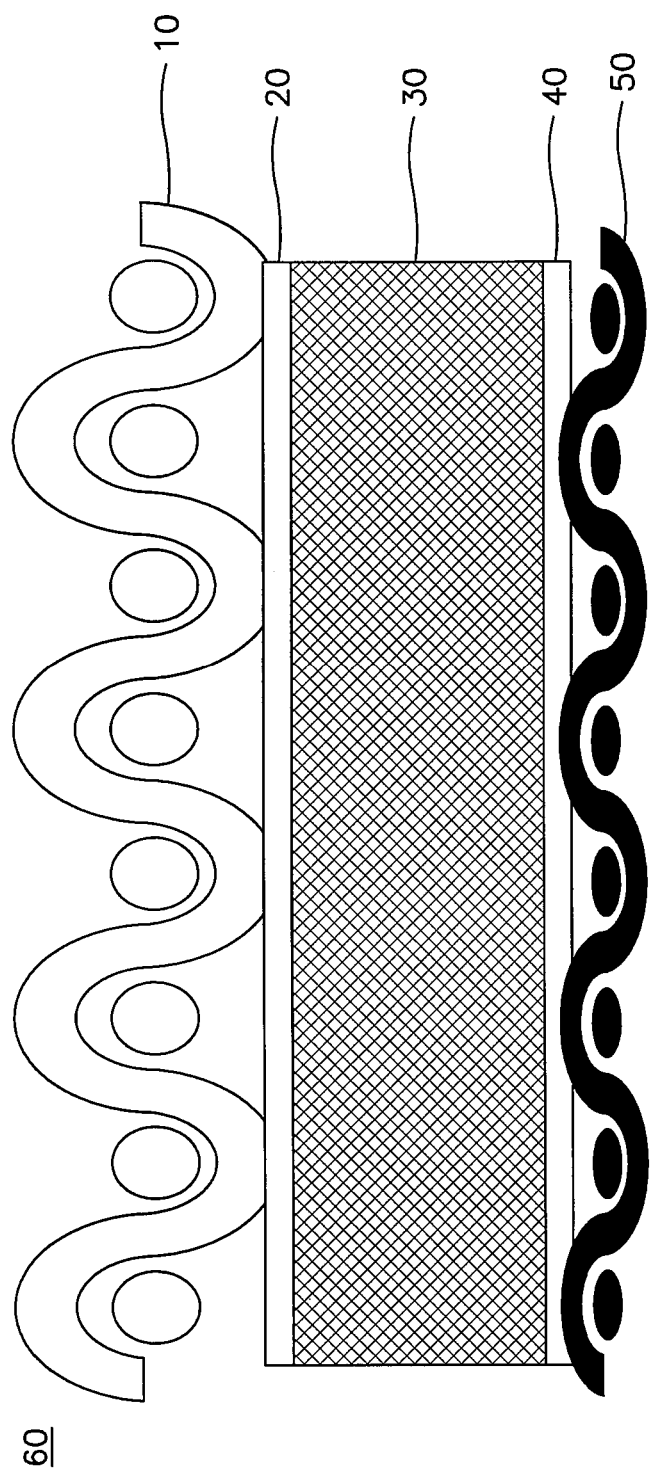
FIG. 1 is a cross-sectional view of one embodiment of a laminate construction of the present invention.
Figure 2:
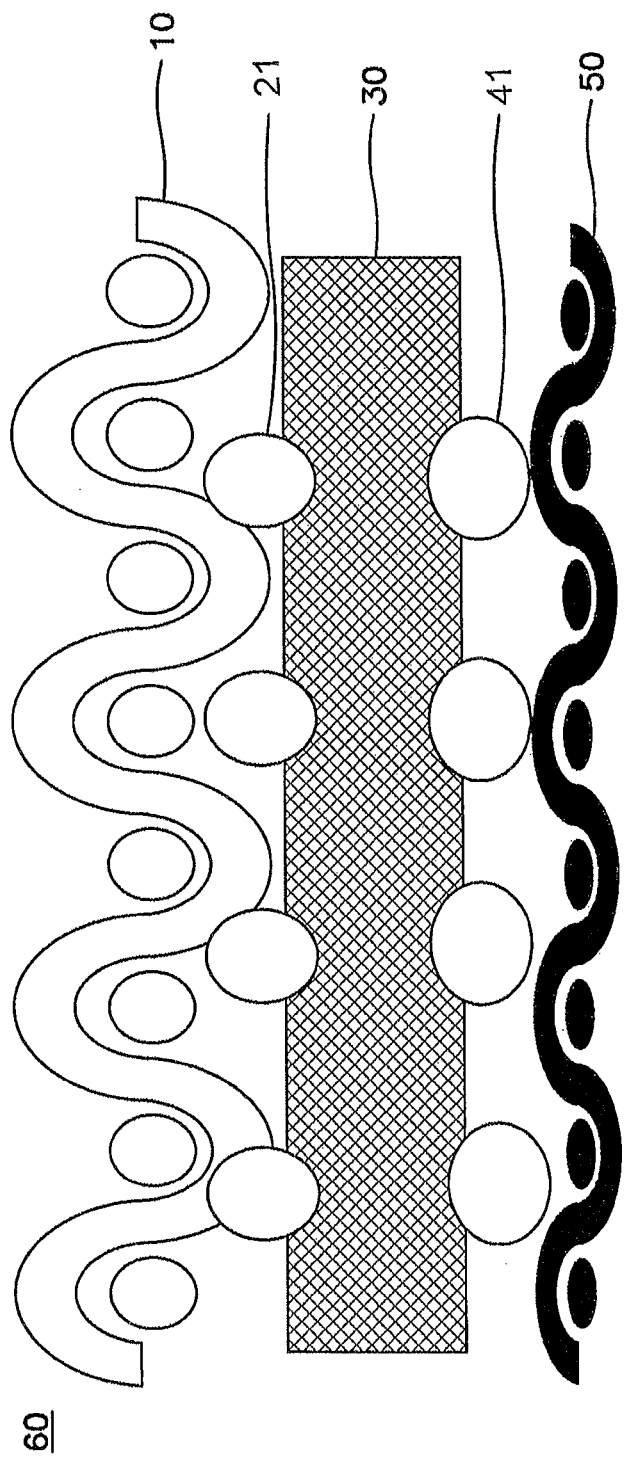
FIG. 2 is a cross-sectional view of an alternate embodiment of a laminate construction of the present invention.

Referring to FIG. 1, a laminate construction 60 of the present invention comprises a meltable outer textile layer 10 laminated with a continuous adhesive layer 20 to a protective layer 30 which is further laminated with a continuous adhesive layer 40 to a thermally stable backer textile layer 50. It should be noted that the choice of adhesive and application technique may vary depending on the specific choices of materials and properties of the final laminate construction. For example, FIG. 2 shows an alternate construction of a laminate construction 60 of the present invention, wherein discontinuous layers of adhesive 21 and 41 bond the layers together.

Figure 3:
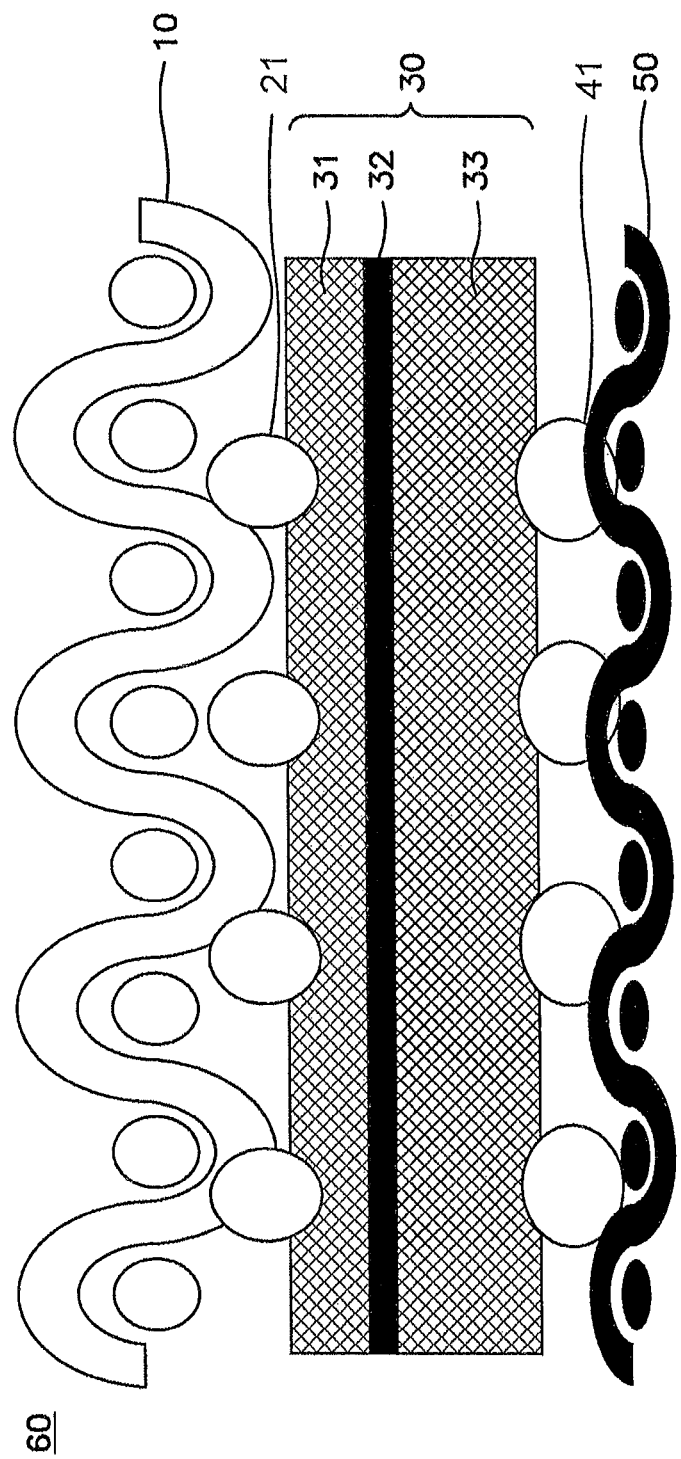
FIG. 3 is a cross-sectional view of a further alternate embodiment of a laminate construction of the present invention.

Referring to FIG. 3, there is shown a further alternative construction for a laminate 60 of the invention, wherein a meltable outer textile layer 10 is laminated with a discontinuous adhesive layer 21 to protective layer 30. In this embodiment, the protective layer 30 comprises two layers of expanded PTFE 31, 33 bonded together with a continuous adhesive layer 32. The protective layer 30 is then bonded with a discontinuous adhesive layer 41 to a thermally stable backer textile layer 50.

Measurement and Test Methods

Melting and Thermal Stability Test

The test is based on thermal stability test as described in section 8.3 of NFPA 1975, 2004 Edition. The test oven was a hot air circulating oven as specified in ISO 17493. The test was conducted according to ASTM D 751, Standard Test Methods for Coated Fabrics, using the Procedures for Blocking Resistance at Elevated Temperatures (Sections 89 to 93), with the following modifications:

Borosilicate glass plates measuring 100 mm×100 mm×3 mm (4 in.×4 in.×⅛ in.) were used.

A test temperature of 265° C., +3/−0° C. (510° F., +5/−0° F.) was used.

The specimens were allowed to cool a minimum of 1 hour after removal of the glass plates from the oven.

Any sample side sticking to glass plate, sticking to itself when unfolded or showing evidence of melting or dripping was considered as meltable. Any sample side lacking evidence of meltable side was considered as thermally stable.

Horizontal Flame Test Procedure:

This test is modeled generally after MIL-C 83429B. A 75 mm by 250 mm laminate sample (3 inch by 10 inch) was clamped in a steel fixture (400 mm long by 75 mm wide with a center window of about 350 mm long and 50 mm wide) using binder clips. The sample was clamped in a manner that secured the edges of the laminate without obstructing the area of laminate present in the window of the steel clamping fixture. The sample in fixture was placed horizontally at a height of about 40 mm in a 90 mm flame (based on butane at 2 psi using a Meeker burner). FIG. 4 depicts the orientation of the laminate construction 60, wherein the meltable face textile layer 10 is oriented adjacent the flame 70 during testing. The sample is exposed to the flame and the time is recorded until the film breaks open, either by cracking or the formation of a hole, and light from the flame is evident when viewing through the crack or opening in the material. The sample is subsequently removed from the flame. The time recorded is referred to as the horizontal flame break open time.

Self-Extinguishing Test

After the material sample is removed from the flame in the Horizontal Flame Test, above, the material is observed for any after flame. If no after flame is observed, or if an after flame is observed upon removal but extinguishes within five (5) seconds after removal from the flame, the material is said to be self-extinguishing.

Moisture Vapor Transmission Rate (MVTR)

A description of the test employed to measure moisture vapor transmission rate (MVTR) is given below. The procedure has been found to be suitable for testing films, coatings, and coated products.

In the procedure, approximately 70 ml of a solution consisting of 35 parts by weight of potassium acetate and 15 parts by weight of distilled water was placed into a 133 ml polypropylene cup, having an inside diameter of 6.5 cm at its mouth. An expanded polytetrafluoroethylene (PTFE) membrane having a minimum MVTR of approximately 85,000 g/m$^2$/24 hrs. as tested by the method described in U.S. Pat. No. 4,862,730 (to Crosby), was heat sealed to the lip of the cup to create a taut, leakproof, microporous barrier containing the solution.

A similar expanded PTFE membrane was mounted to the surface of a water bath. The water bath assembly was controlled at 23° C. plus 0.2° C., utilizing a temperature controlled room and a water circulating bath.

The sample to be tested was allowed to condition at a temperature of 23° C. and a relative humidity of 50% prior to performing the test procedure. Samples were placed so the microporous polymeric membrane was in contact with the expanded polytetrafluoroethylene membrane mounted to the surface of the water bath and allowed to equilibrate for at least 15 minutes prior to the introduction of the cup assembly.

The cup assembly was weighed to the nearest 1/1000 g and was placed in an inverted manner onto the center of the test sample.

Water transport was provided by the driving force between the water in the water bath and the saturated salt solution providing water flux by diffusion in that direction. The sample was tested for 15 minutes and the cup assembly was then removed, weighed again within 1/1000 g.

The MVTR of the sample was calculated from the weight gain of the cup assembly and was expressed in grams of water per square meter of sample surface area per 24 hours.

Water Entry Pressure

Water entry pressure was determined generally following "Option 2-Hydrostatic Head Tester" of the standard test method AATCC 127-2003 entitled "Water Resistance: Hydrostatic Pressure Test". Particularly, the water entry pressure test consists essentially of forcing water against one side of a test piece, and observing the other side of the test piece for indications of water penetration through it.

The test specimen was clamped and sealed between rubber gaskets in a fixture that holds the test piece. The fabric surface of the test specimen was in contact with the water and the other side faced upward, open to the atmosphere, for close observation. Air was removed from inside the fixture and pressure was applied to the inside surface of the test piece, over an area of 7.62 cm (3.0 inches) diameter, as water was forced against it. The water pressure on the test piece was increased to about 3.4 kPa (0.05 psi) by a pump connected to a water reservoir, as indicated by an appropriate gauge and regulated by an in-line valve.

The fabric surface of the test piece was watched closely for the appearance of any water forced through the material. Water seen on the surface is interpreted as a leak. The sample surface is observed for one minute at test pressure, at which time the number of leaks are counted and recorded. A material is considered waterproof if no leaks are observed at 0.5 psi for one minute.

Air Permeability—Gurley Number Method

The resistance of samples to air flow was measured by a Gurley densometer manufactured by W. & L.E. Gurley & Sons in accordance with the procedure described in ASTM Test Method D726-58. The results are reported in terms of Gurley Number, or Gurley-Seconds, which is the time in seconds for 100 cubic centimeters of air to pass through 1 square inch of a test sample at a pressure drop of 4.88 inches of water.

A sample is determined to be air permeable if it has a Gurley number of less than 45 seconds.

Thickness

Membrane thickness was measured by placing the membrane between the two plates of a Kafer FZ1000/30 thickness snap gauge (Käfer Messuhrenfabrik GmbH, Villingen-Schwenningen, Germany). The average of three measurements was used.

Density

Samples die cut to form rectangular sections 2.54 cm by 15.24 cm were measured to determine their mass (using a Mettler-Toledo analytical balance Model AG204) and their thickness (using a Kafer FZ1000/30 snap gauge). Using these data, density was calculated with the following formula:

$$\rho = \frac{m}{w * l * t}$$

in which: $\rho$=density (g/cc); m=mass (g); w=width (cm); l=length (cm); and t=thickness (cm). The average of the three measurements was used.

Without intending to limit the scope of the present invention, the following examples illustrate how the present invention may be made and used:

EXAMPLES

Formation of Protective Layers for Incorporation into Laminates

Protective Layer 1

A protective layer comprising two layers of expanded PTFE film for use in laminates of this invention was constructed as follows:

One ePTFE membrane weighing about 18 grams per square meter (gsm), having an average pore size of 0.3 microns and a thickness of about 0.001 inch. was coated with a continuous, partially penetrated layer of 15 gsm of a breathable, moisture cured polyurethane in accordance with the teachings of U.S. Pat. No. 4,194,041. A second ePTFE membrane having the same properties as the first membrane was brought in contact with the polyurethane coated side of the aforementioned coated ePTFE and combined in a nip to form a three-component construction. The film was partially cured in an oven and then allowed to fully cure on a roll at >50% RH for 7 days.

Protective Layer 2:

A protective layer was constructed by treating the ePTFE portions of Protective Layer 1 with a functional coating comprised of a fluoroacrylate polymer as described in Example 3 of U.S. Patent Application Publication No/2007/0009679, except that the amount of carbon black used was about 0.75% by weight.

Example 1

A laminate of the current invention was made using NOMEX® Synergy Lite 60 gsm meta-aramid fiber woven textile, (part number 25050, available from Springfield, LLC, Rock Hill, S.C.), Protective Layer 1 and a 95 gsm nylon 6,6 plain weave face fabric (available from Milliken as Part Number 131967). The laminate was constructed by first printing discrete dots of a hot-melt, moisture curable polyurethane adhesive (made in accordance with U.S. Pat. No. 4,532,316), with ANTIBLAZE PR82 phosphorus-based additive (sold by Albemarle Corporation, Baton Rouge, La.) in an amount of about 20% by weight, onto the protective layer then adhering the 95 gsm nylon woven to the film using a nip. The resultant laminate created was a two layer laminate of the protective layer and the nylon woven meltable face textile layer. This two layer laminate was fed through an additional process step where the same adhesive was applied in a discrete dot pattern to the exposed protective layer face (on the side opposite the nylon woven textile). The 60 gsm aramid woven thermally stable textile layer was then adhered to the two layer laminate by feeding the adhesive printed two layer laminate and the aramid backer through an additional nip. The package was then taken up onto a steel drum under tension and allowed to cure for 48 hours at >50% relative humidity.

The nylon woven textile side of the three layer laminate was subsequently, coated with a conventional fluoroacrylate-based durable water repellent (DWR) finish.

Example 2

A laminate of the present invention was made substantially according to Example 1, except that Protective Layer 2, described above, was used for the protective layer.

Example 3

A laminate of the present invention was made substantially according to Example 2, except that a 85 gsm nylon 6,6 woven fabric outer meltable textile layer was used (Milliken Industries Part Number 131861).

Example 4

A laminate of the present invention was made substantially according to Example 2, except that the thermally stable backer textile layer was an 85 gsm woven fabric comprised of a yarn having a fiberglass core with a polyester modacrylic wrapped sheath supplied by Inman Mills, Inc., Inman, S.C. (Part Number A-2986).

Comparative Example A

A comparative three layer ePTFE laminate was made by laminating a 95 gsm nylon 6,6 woven textile (Milliken Industries, Inc., Part Number 131967) described in Example 1) by first printing discrete dots of a hot-melt, moisture curable polyurethane adhesive (made in accordance with U.S. Pat. No. 4,532,316) onto the ePTFE side of a bi-component ePTFE/polyurethane film (made in accordance with U.S. Pat. No. 4,194,041. This construction was then laminated to a 50 gsm nylon 6,6 knit textile (Glenn Raven, Inc. Part Number A1389) on the polyurethane side of the bi-component ePTFE/polyurethane film using a hot melt, moisture curable polyurethane adhesive (no additive used) in a manner similar to that described in Example 1. The laminate was subsequently treated with a durable water repellent (DWR) finish in a manner similar to Example 1.

Comparative Example B

A second comparative three layer ePTFE laminate was made in a manner similar to Example 1 except the face textile comprised a 120 gsm woven Nomex® textile from Springfield, LLC (Style Number 25030).

Comparative Example C

A third comparative laminate was made using only a 95 gsm nylon 6,6 plain weave face textile from Milliken (part number 131967), and Protective Layer 1. The laminate was constructed by first printing discrete dots of the adhesive described in Example 1 onto the Protective Layer 1, then adhering the 95 gsm nylon woven textile to the film using a nip. The package was then taken up onto a steel drum under tension and allowed to cure for 48 hours at >50% relative humidity. The resultant two layer laminate was subsequently treated with a durable water repellent (DWR) finish in a manner similar to Example 1.

Comparative Example D

A comparative laminate was made using 60 gsm meta-aramid fiber woven textile from Springfield, LLC, Style Number 25050) and Protective Layer 1. The laminate was constructed in the same manner as described for Comparative Example C.

The table below compares laminates from Examples 1-4 and Comparative Examples A-D for flame protection. The samples were exposed to a horizontal flame test, and the time required to cause film break open (in the flame) as well as tendency to self extinguish were noted.

TABLE 1

Horizontal Burn Test Results For Example 4-8 and Comparative Examples A and B

| Example | Break Open Time (sec.) | Self-extinguish | WEP | MVTR (g/m$^2$/24 hr) | Laminate weight (oz/yd$^2$) |
|---|---|---|---|---|---|
| 1 | 35 | Yes | Pass | 7233 | 6.5 |
| 2 | 35 | Yes | Pass | 6000 | 6.8 |

TABLE 1-continued

Horizontal Burn Test Results For Example
4-8 and Comparative Examples A and B

| Example | Break Open Time (sec.) | Self-extinguish | WEP | MVTR (g/m²/24 hr) | Laminate weight (oz/yd²) |
|---|---|---|---|---|---|
| 3 | 25 | Yes | Pass | 5220 | 6.5 |
| 4 | 20 | Yes | Pass | 6093 | 7.6 |
| Comparative A | 12 | No | Pass | 5900 | 5.4 |
| Comparative B | 16 | Yes | Pass | 4100 | 8.4 |
| Comparative C | 6 | No | Pass | 10751 | 4.8 |
| Comparative D | 4 | Yes | Pass | 11490 | 3.6 |

The invention claimed is:

1. A laminate comprising:
a layer of meltable face textile;
a first flame retardant adhesive material bonding said face textile to a protective layer comprising at least two layers of expanded PTFE bonded together, wherein said at least two layers of expanded PTFE are bonded together with a polyurethane adhesive;
a second flame retardant adhesive material bonding said protective layer to
a thermally stable backer textile layer, said thermally stable backer textile layer being non-meltable at temperatures up to about 265° C.

2. The laminate of claim 1, wherein said meltable face textile layer comprises at least one material selected from the group consisting of nylon, polyester, polypropylene, modacrylic and polyethylene.

3. The laminate of claim 1, wherein said meltable face textile layer comprises at least one material selected from the group consisting of nylon 6, nylon 6,6 and nylon 4,6.

4. The laminate of claim 1, wherein said second flame retardant adhesive comprises at least one material selected from the group consisting of polyester and silicone.

5. The laminate of claim 1, wherein said thermally stable backer textile layer comprises at least one material selected from the group consisting of wovens, knits, nonwovens and flock fibers adhered to a substrate.

6. The laminate of claim 1, wherein said thermally stable backer textile layer comprises at least one material selected from the group consisting of aramids, cottons, rayon, wool, modacrylic blends, and blends and combinations thereof.

7. The laminate of claim 1 in the form of a garment.

8. The laminate of claim 1 in the form of a bivy bag.

9. The laminate of claim 1 in the form of a tent.

10. The laminate of claim 1, wherein said laminate has an overall laminate weight of about 20 oz/yd² or less.

11. The laminate of claim 1, wherein said laminate has an overall laminate weight of about 10 oz/yd² or less.

12. The laminate of claim 1, wherein said laminate has an overall laminate weight of about 7 oz/yd² or less.

13. The laminate of claim 1, wherein said laminate has a breathability of >4000 MVTR.

14. The laminate of claim 1, wherein said meltable face textile comprises at least one material selected from the group consisting of polyamide and polyester.

15. The laminate of claim 1, wherein said first flame retardant adhesive material includes at least one material selected from the group consisting of chlorinated compounds, brominated compounds, antimony oxide, organic phosphorous-based compounds, zinc borate, ammonium polyphosphate, melamine cyanurate, melamine polyphosphate, molybdenum compounds, alumina trihydrate and magnesium hydroxide.

16. The laminate of claim 1, wherein said second flame retardant adhesive material includes at least one material selected from the group consisting of chlorinated compounds, brominated compounds, antimony oxide, organic phosphorous-based compounds, zinc borate, ammonium polyphosphate, melamine cyanurate, melamine polyphosphate, molybdenum compounds, alumina trihydrate and magnesium hydroxide.

17. The laminate of claim 1, wherein said laminate has a water entry pressure of at least 0.7 psi.

18. The laminate of claim 1, wherein said polyurethane adhesive comprises a continuous polyurethane adhesive layer.

19. The laminate of claim 1, wherein said laminate has a horizontal flame break open time of at least 20 seconds.

20. The laminate of claim 1, wherein said laminate self-extinguishes within five seconds after removal from a flame.

21. A laminate comprising:
a meltable outer textile layer comprising a member selected from the group consisting of polyamide, polyester, polypropylene and polyethylene;
a first adhesive material bonding said outer textile layer to
a protective layer comprising a waterproof film, wherein the protective layer comprises at least two layers of expanded polytetrafluoroethylene bonded together with a polyurethane adhesive;
a second adhesive material bonding said protective layer to
a thermally stable backer textile layer, said thermally stable backer textile layer being selected from the group consisting of aramids, cottons, carbon, fiberglass, rayon, wool, modacrylic blends and combinations thereof.

22. The laminate of claim 21, wherein said laminate self-extinguishes within five seconds after removal from a flame.

23. The laminate of claim 21, wherein at least one of said first adhesive material and said second adhesive material enhance the flame resistance of said laminate.

24. The laminate of claim 21, wherein said outer meltable outer textile layer comprises at least one material selected from the group consisting of polyamide and polyester.

25. The laminate of claim 21, wherein said laminate has a breathability >1000 MVTR.

26. The laminate of claim 21, wherein said laminate has a water entry pressure of at least 0.5 psi.

27. The laminate of claim 21, wherein said laminate has a horizontal flame break open time of at least 20 seconds.

28. A laminate comprising:
a meltable outer textile layer;
a first adhesive material bonding said outer textile layer to
a protective layer comprising at least two layers of polytetrafluoroethylene or expanded polytetrafluoroethylene, wherein the two layers of polytetrafluoroethylene or expanded polytetrafluoroethylene are bonded together with a polyurethane adhesive;
a second adhesive material bonding said protective layer to
a thermally stable backer textile layer, said thermally stable backer textile layer being thermally stable at temperatures up to about 265° C.

29. The laminate of claim 28, wherein said laminate self-extinguishes.

30. The laminate of claim 29, wherein said laminate self-extinguishes within five seconds after removal from a flame.

31. The laminate of claim 28, wherein at least one of said first adhesive material and said second adhesive material enhances the flame resistance of said laminate.

32. The laminate of claim 28, wherein said outer meltable outer textile layer comprises at least one material selected from the group consisting of polyamide and polyester.

33. The laminate of claim 28, wherein said laminate has a horizontal flame break open time of at least 20 seconds.

* * * * *